United States Patent
Osada et al.

(10) Patent No.: US 8,247,130 B2
(45) Date of Patent: Aug. 21, 2012

(54) SOLID OXIDE ELECTROCHEMICAL CELL AND PROCESSES FOR PRODUCING THE SAME

(75) Inventors: Norikazu Osada, Fuchu (JP); Takayuki Fukasawa, Yokohama (JP); Keizo Shimamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 596 days.

(21) Appl. No.: 12/394,122

(22) Filed: Feb. 27, 2009

(65) Prior Publication Data

US 2009/0220837 A1    Sep. 3, 2009

(30) Foreign Application Priority Data

Feb. 29, 2008   (JP) .............................. P. 2008-050946

(51) Int. Cl.
*H01M 8/10* (2006.01)

(52) U.S. Cl. ........ 429/465; 429/479; 429/491; 429/405; 429/484; 429/485; 429/489; 429/523

(58) Field of Classification Search .................. 429/465, 429/479, 491, 405, 484, 485, 488, 489, 523
See application file for complete search history.

(56) References Cited

U.S. PATENT DOCUMENTS

| | | | |
|---|---|---|---|
| 7,141,329 B2 * | 11/2006 | Hong et al. | 429/528 |
| 7,435,274 B2 * | 10/2008 | Suenaga et al. | 48/127.9 |
| 2009/0152107 A1 * | 6/2009 | Reed et al. | 204/279 |

OTHER PUBLICATIONS

Watanabe et al., "High Performance Catalyzed-Reaction Layer for Medium Temperature Operating Solid Oxide Fuel Cells," J. Electrochem. Soc. (Feb. 1994), 141:342-346.
Fukasawa et al., U.S. Appl. No. 12/204,978, filed Sep. 5, 2008, entitled "Fuel Electrodes for Solid Oxide Electrochemical Cell, Processes for Producing the Same, and Solid Oxide Electrochemical Cells".
Fukasawa et al., U.S. Appl. No. 12/204,982, filed Sep. 5, 2008, entitled "Fuel Electrodes for Solid Oxide Electrochemical Cell, Processes for Producing the Same, and Solid Oxide Electrochemical Cells".

* cited by examiner

*Primary Examiner* — Melvin C Mayes
*Assistant Examiner* — Melissa Stalder
(74) *Attorney, Agent, or Firm* — Finnegan, Henderson, Farabow, Garrett & Dunner, L.L.P.

(57) ABSTRACT

A hydrogen electrode constituted of a mixed phase composed of an oxide sinter having particles of at least one member selected from Ni, Co, Fe, and Cu on a surface part thereof and coated wholly or partly with a film having mixed conductivity and a sinter having ionic conductivity is formed on a surface of an electrolyte having oxygen ion conductivity.

6 Claims, 7 Drawing Sheets

SOLID OXIDE ELECTROCHEMICAL CELL AND PROCESSES FOR PRODUCING THE SAME

CROSS-REFERENCE TO RELATED APPLICATIONS

This application is based upon and claims the benefit of priority from the prior Japanese Patent Application No. 2008-50946 filed on Feb. 29, 2008, the entire contents of which are incorporated herein by reference.

BACKGROUND OF THE INVENTION

1. Field

The present invention relates to a solid oxide electrochemical cell such as, e.g., a solid oxide fuel cell (SOFC) and a solid oxide electrolysis cell (SOEC), to a hydrogen electrode material for use in the cell, and to processes for producing the cell.

2. Description of Related Art

Examples of solid oxide electrochemical cells include solid oxide fuel cells (SOFCs) and solid oxide electrolysis cells (SOECs). The solid oxide electrochemical cells have a high operating temperature (700-1,000° C.). Because of this, SOFCs are hopeful as a next-generation clean power generation system having a high power generation efficiency and reduced in $CO_2$ generation. On the other hand, SOECs are hopeful in a high-efficiency hydrogen production method capable of yielding high-purity hydrogen in one step.

For producing a hydrogen electrode material for solid oxide electrochemical cells, a method is generally employed in which ceramic particles having ionic conductivity are mixed with metal particles having electronic conductivity. Other techniques have been disclosed which include one in which SDC ($CeO_2$ doped with $Sm_2O_3$) particles having electron/oxide ion mixed conductivity are used and fine particles of nickel are highly dispersedly deposited on the surface of the SDC particles for the purpose of attaining higher performances (see *J. Electrochem. Soc.*, 141, [2], 342-346, 1994).

In the technique in which the SDC material having mixed conductivity is used, nickel particles are formed in a porous material constituted of an SDC network by the impregnation method using, e.g., an aqueous metal salt solution. This technique has succeeded in reducing the size of nickel particles by at least one order of magnitude and in obtaining high catalytic activity with a smaller nickel addition amount and forming a complete electron network within the electrode. In addition, since SDC further has electronic conductivity, the boundary between each of all the fine nickel particles and the SDC theoretically functions as a three-phase boundary. There is a description in that document to the effect that bonding between the nickel and the SDC is relatively satisfactory. However, because nickel particles are formed by impregnation with the solution, burning, and reduction, the particles change in size with time or particle sintering occurs during the burning step, resulting in an uneven structure.

For reducing overvoltage and increasing catalytic activity in a hydrogen electrode, it is necessary to use finer metal particles (e.g., nickel particles) as a catalyst and thereby increase the number of active sites. However, in a high-temperature reducing atmosphere, the metal particles readily move, grow, and aggregate. Furthermore, it is difficult to incorporate nickel particles in an unnecessarily large amount partly because of a difference in the coefficient of thermal expansion. In addition, in case where abrupt oxidation has occurred, the formation of an oxide results in volume expansion and this may cause cell breakage.

The present inventors previously proposed a process for catalyst production based on reduction deposition from an Ni—Al composite oxide solid solution as a technique for reducing the size of nickel particles to improve catalytic activity, inhibiting catalyst sintering, and constituting an electrode in which components have the same coefficient of thermal expansion. However, the fine metal particles deposited are not in an interconnected state, and aluminum oxide, which is an insulator, is formed after the reduction deposition. Consequently, it has been necessary to cause conductive particles to coexist with the fine metal particles and the aluminum oxide to form conduction paths. It is therefore difficult to bring all deposited particles into contact with the conductive particles, and that part of the deposited particles which remain electrically isolated from the conduction paths has contributed to electrical resistance. Because of this, it has been impossible to attain the high activity necessary for realizing a solid oxide electrochemical cell.

BRIEF SUMMARY OF THE INVENTION

The invention may provide a solid oxide electrochemical cell including a solid oxide electrolyte layer having ionic conductivity, a hydrogen electrode formed on one side of the electrolyte layer, and an oxygen electrode formed on the other side of the electrolyte layer so that the electrolyte layer is sandwiched between the electrodes, wherein the hydrogen electrode is constituted of: an oxide sinter which has fine metal particles deposited on the surface thereof and the surface of which is coated with a film having mixed conductivity; and a sinter having ionic conductivity. The sinter having ionic conductivity may have mixed conductivity, i.e., may have both ionic conductivity and electronic conductivity.

In the solid oxide electrochemical cell of an example of the embodiments of the invention, the hydrogen electrode preferably is one in which the oxide sinter is an aluminum-based oxide or a magnesium-based oxide, and the fine metal particles are particles of at least one metal selected from Ni, Co, Fe, and Cu.

In the solid oxide electrochemical cell of another example of the embodiments of the invention, the hydrogen electrode preferably is one in which the sinter having ionic conductivity includes at least one member selected from a $ZrO_2$-based material stabilized with $Y_2O_3$ or $Sc_2O_3$, $CeO_2$ doped with $Sm_2O_3$ (SDC), $CeO_2$ doped with $Gd_2O_3$ (GDC), and $CeO_2$ doped with $Y_2O_3$ (YDC), and the film having mixed conductivity includes at least one member selected from SDC, GDC, and YDC.

The solid oxide electrochemical cell of still another example of the embodiments of the invention preferably has a constitution which further includes a current collector and in which the hydrogen electrode has a conductive layer having a porosity of 30 to 80% and including a mixture including (i) at least one metal material selected from Pt, Au, Ag, Ni, Fe, Co and Cu or an alloy containing two or more of the metals, and (ii) an ion conductive material or a material having electron/ion mixed conductivity, which materials constitute the hydrogen electrode, said conductive layer being in contact with the current collector.

In the solid oxide electrochemical cell of a further example of the embodiments of the invention, it is preferable that the conductive layer is formed by means of a screen printing method, a splay coating method or a vapor deposition method and the area occupied by the conductive layer accounts for 40 to 100% of the hydrogen electrode surface.

In the solid oxide electrochemical cell of a still further example of the embodiments of the invention, the oxide electrode preferably includes a layer of a composite oxide represented by $Ln_{1-x}A_xBO_{3-TM}$ (wherein Ln is at least one rare-earth element; A is at least one of Sr, Ca, and Ba; B is at least one of Cr, Mn, Fe, Co, and Ni; x is a positive number of from 0 to 1; and TM is a positive number of from 0 to 3) or a layer of a mixture of the composite oxide and at least one member selected from SDC, GDC, and YDC.

The invention further may provide a process for producing solid oxide electrochemical cell including a solid oxide electrolyte layer having ionic conductivity, an oxygen electrode formed on one side of the electrolyte layer, and a hydrogen electrode formed on the other side of the electrolyte layer so as to sandwich the electrolyte layer between the electrodes and including an oxide sinter which has fine metal particles deposited on the surface thereof and the surface of which is coated with a film having mixed conductivity and a sinter which has ionic conductivity, the process including: superposing a layer of a mixture of an oxide solid solution, at least one metal salt, and the sinter having ionic conductivity on the solid oxide electrolyte layer; subsequently sintering the layer to thereby form the film having mixed conductivity on the surface of the oxide solid solution and on the surface of the sinter having ionic conductivity, the film with mixed conductivity being made of an oxide of the metal salt; and then reducing the layer at 800-1,000° C. to thereby change the oxide solid solution into the oxide sinter having fine metal particles exposed on the surface thereof.

The invention furthermore may provide a process for producing solid oxide electrochemical cell including a solid oxide electrolyte layer having ionic conductivity, an oxygen electrode formed on one side of the electrolyte layer, and a hydrogen electrode formed on the other side of the electrolyte layer so as to sandwich the electrolyte layer between the electrodes and including an oxide sinter which has fine metal particles deposited on the surface thereof and the surface of which is coated with a film having mixed conductivity and a sinter which has ionic conductivity, the process including: sintering a mixture of an oxide solid solution and at least one metal salt to thereby form a coating film having mixed conductivity on the surface of the oxide solid solution; superposing a layer of a mixture of the resultant coated oxide solid solution and the sinter having ionic conductivity on the solid oxide electrolyte layer; and then sintering the layer superposed and thereafter reducing the sintered layer at 800-1,000° C. to thereby change the oxide solid solution into the oxide sinter having fine metal particles exposed on the surface thereof.

According to the embodiments of the invention, the high activity necessary for realizing a solid oxide electrochemical cell can be achieved due to the constitutions described above.

DETAILED DESCRIPTION OF THE INVENTION

Figure 1:
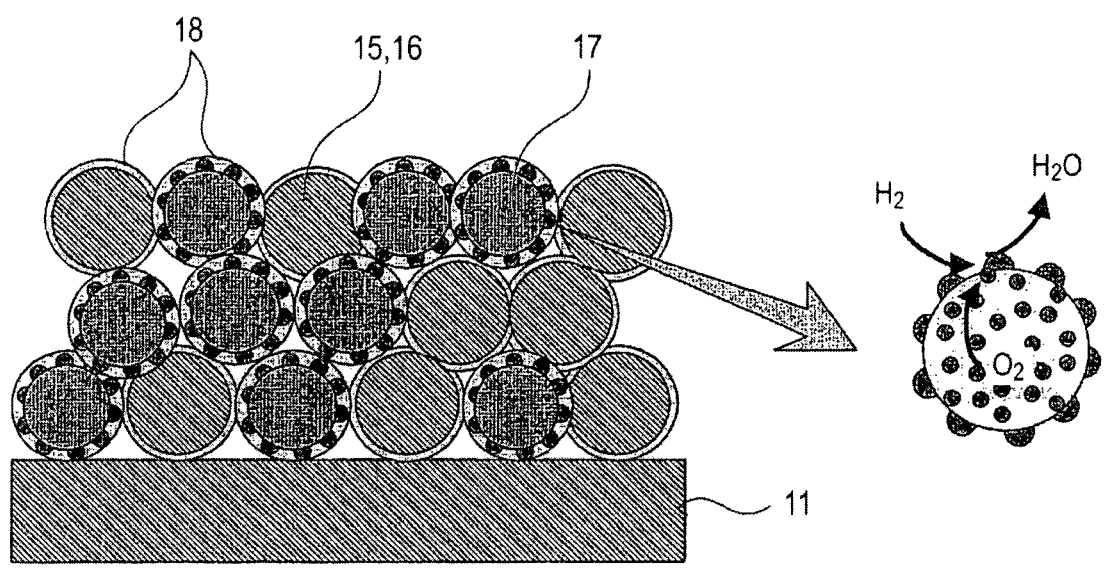
FIG. 1 is a diagrammatic sectional view illustrating the structure of the hydrogen electrode of a solid oxide electrochemical cell (SOFC) according to one example of embodiments of the invention.

The hydrogen electrode material for use in the solid oxide electrochemical cell according to the embodiments of the invention and processes for producing the hydrogen electrode according to the embodiments are explained below. However, the invention should not be construed as being limited to the following embodiments or Examples. The diagrammatic views which are referred to in the following explanations are for illustrating the positional relationship between constituents, and the sizes of the particles, the thickness ratio among the layers, etc. do not always coincide with actual ones.

The following embodiments of the invention relate to a hydrogen electrode and a solid oxide electrochemical cell employing the electrode.

First, a solid oxide electrochemical cell in the SOFC mode as an example is used to explain the embodiments below by reference to the diagrammatic sectional views of FIGS. 1 and 2. This electrochemical cell has a multilayer structure composed of a solid oxide electrolyte plate 11, a hydrogen electrode material 12 disposed on one side of the plate 11, and an oxygen electrode material 13 disposed on the other side thereof.

The oxygen electrode 13 includes a composite oxide which is an oxide showing mixed conductivity and represented by the general formula $Ln_{1-x}A_xBO_{3-TM}$ (wherein Ln is at least one rare-earth element; A is at least one of Sr, Ca, and Ba; B is at least one of Cr, Mn, Fe, Co, and Ni; x is a positive number of from 0 to 1; and TM is a positive number of from 0 to 3). This composite oxide efficiently dissociates oxygen and has electronic conductivity. Although the composite oxide is slightly deficient in ionic conductivity, this deficiency may be compensated for by further adding an ionically conductive oxide. As this ionically conductive oxide, use may be made of any one of $CeO_2$ doped with $Sm_2O_3$, $CeO_2$ doped with $Gd_2O_3$, and $CeO_2$ doped with $Y_2O_3$. These oxides are materials which show mixed conductivity in a reducing atmosphere but show high ionic conductivity in an oxygen-containing atmosphere and which do not react with that oxide showing mixed conductivity. The term "mixed conductivity" herein means a property simultaneously showing ionic conductivity and electronic conductivity.

Oxide ions ($O^{2-}$) formed by dissociation in the oxygen electrode 13 pass through the solid oxide electrolyte 11 and move to the hydrogen electrode 12, where the ions react with hydrogen to yield water. Electrons generate from this reaction and are taken out through an external circuit to conduct power generation.

The dissociation of oxygen on the oxygen electrode side and the reaction of hydrogen with oxygen ions on the hydrogen electrode side each occur at those three-phase boundaries in the electrode where all of electrons, ions, and a reactant gas are present. Because of this, how to form such three-phase boundaries in a larger amount is an important subject.

The present inventors previously proposed a process for catalyst production based on reduction deposition from an Ni—Al composite oxide solid solution, and have demonstrated the performances of an electrode including a mixture of the catalyst produced by this process and particles having ionic conductivity or electron/ion mixed conductivity. This technique has succeeded in forming fine metal particles on an aluminum-based oxide base and in obtaining a large catalyst surface area with a small metal catalyst amount. In addition, since the metal particles produced are ones deposited from the solid solution upon reduction, these metal particles have been fixed to the base and are less apt to sinter in a high-temperature reducing atmosphere. However, the volume of the insulator base is large as compared with the volume of the deposited fine metal particles and, hence, electrode formation gives an electrode layer having increased internal ohmic resistance. Moreover, since not all of the fine metal particles as a catalyst on the base surface are thought to be in contact with the material having ionic conductivity or electron/ion mixed conductivity, it is thought that the catalyst deposited is not in the state of being effectively utilizable.

The inventors hence propose to form a coating film 18 having electron/ion mixed conductivity on the surface of the insulator base to thereby impart electronic/ionic conductivity to the insulator surface and enable a large proportion of the metal catalyst on the base to have a three-phase boundary. This coating film 18 having mixed conductivity may contain a small amount of noble-metal particles. The hydrogen electrode 12 in the embodiments is constituted of a mixed phase (electrode layer) composed of: an ionically conductive oxide 15 or an oxide 16 having mixed conductivity; and particles each constituted of an aluminum-based composite oxide 17 having particles of at least one member selected from Ni, Co, Fe, and Cu deposited on a surface part thereof and a coating film 18 of an oxide having mixed conductivity with which the surface of the oxide 17 has been wholly or partly coated. This hydrogen electrode 12 may be equipped with a conductive layer 19 formed in a surface layer part of the electrode layer and containing a material having higher electronic conductivity than the electrode layer, and with a current collector 14 electrically connected to the conductive layer 19.

Figure 3:
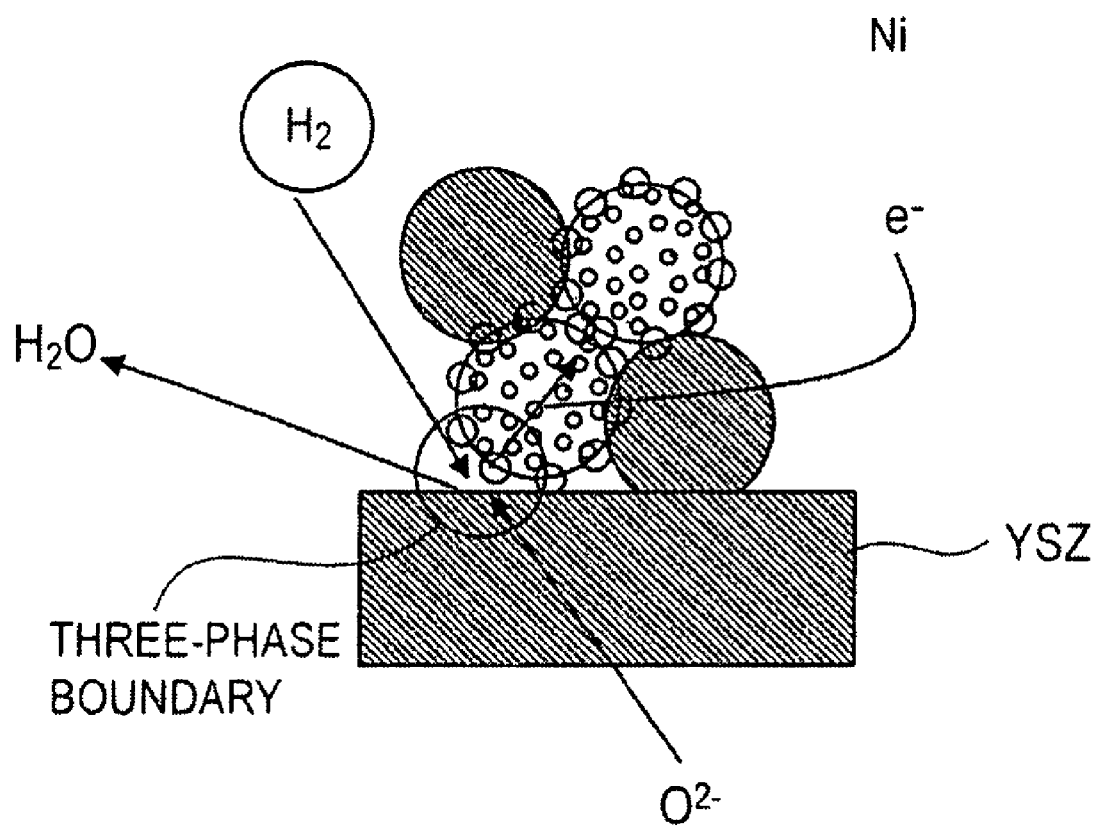
FIG. 3 is a diagrammatic sectional view illustrating a three-phase boundary in the hydrogen electrode according to the example of embodiments.

FIG. 3 is a diagrammatic view of a three-phase boundary in the hydrogen electrode 12. This figure diagrammatically illustrates a reaction occurring at a boundary where the catalyst (Ni) deposited from an aluminum-based oxide, a material having mixed conductivity (SDC), and feed gas $H_2$ exist.

A process for producing this hydrogen electrode 12, as an example, which includes an Ni—Al oxide and SDC as a material having mixed conductivity and employs SDC as the coating film 18 having mixed conductivity is explained below.

Figure 2:
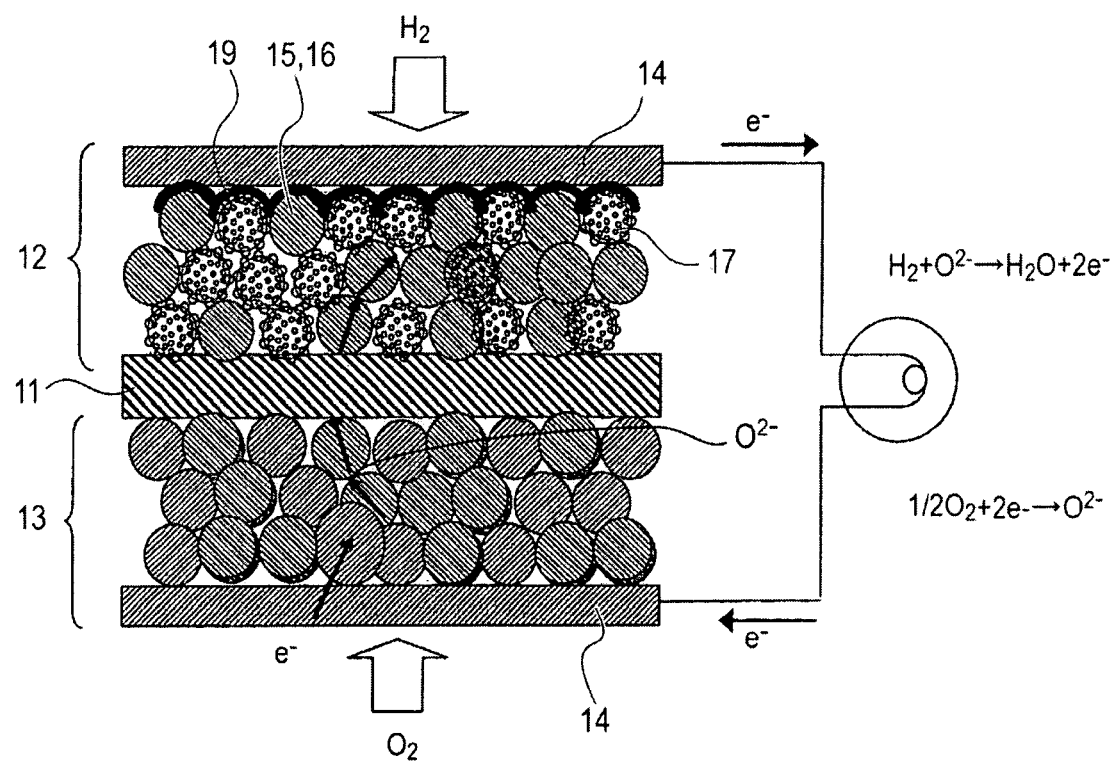
FIG. 2 is a diagrammatic sectional view illustrating the structure of the SOFC according to the example of embodiments of the invention.
Figure 4:
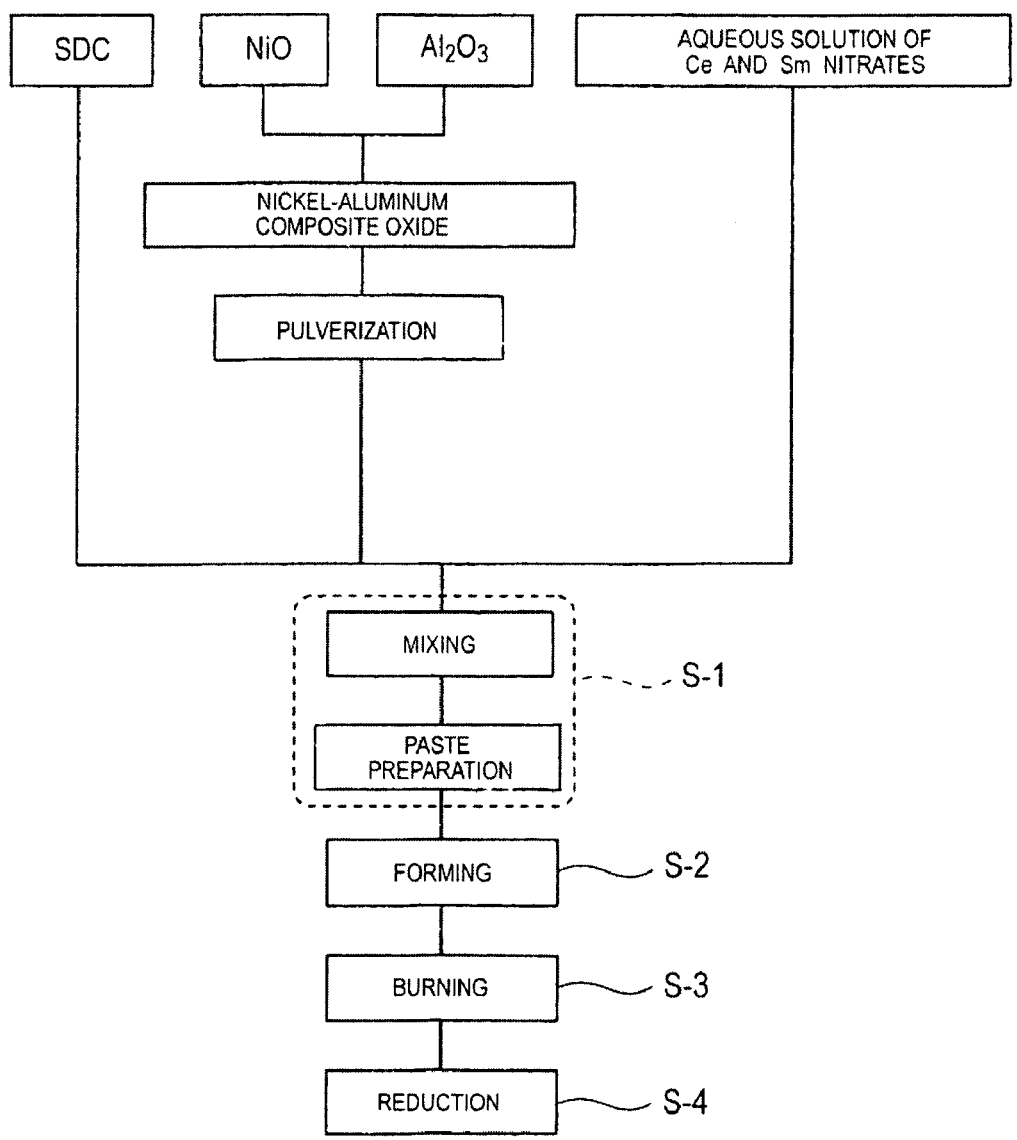
FIG. 4 is a flowchart showing steps for producing the hydrogen electrode according to the example of embodiments.
Figure 5:
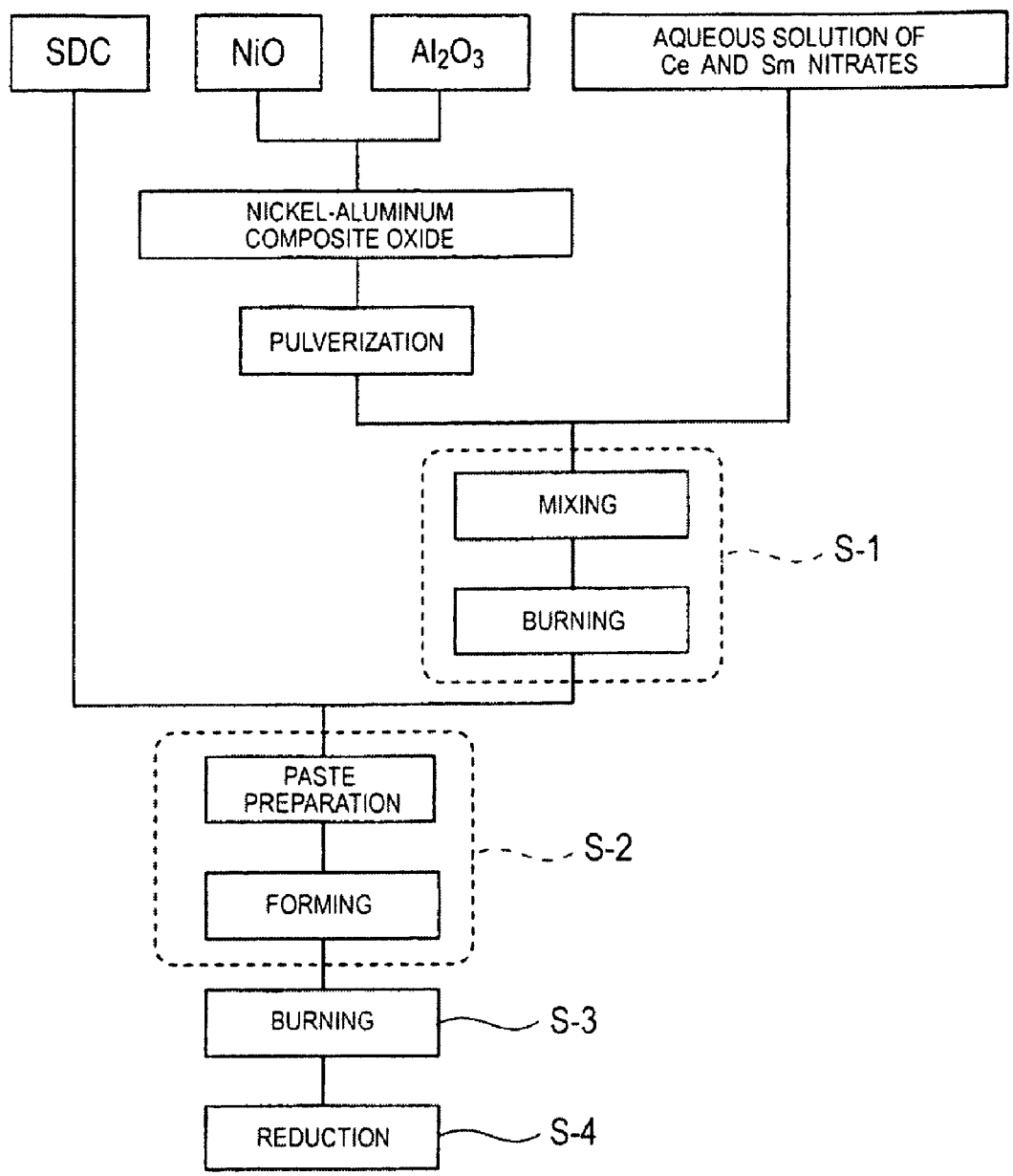
FIG. 5 is a flowchart showing other steps for producing the hydrogen electrode according to the example of embodiments.
Figure 6:
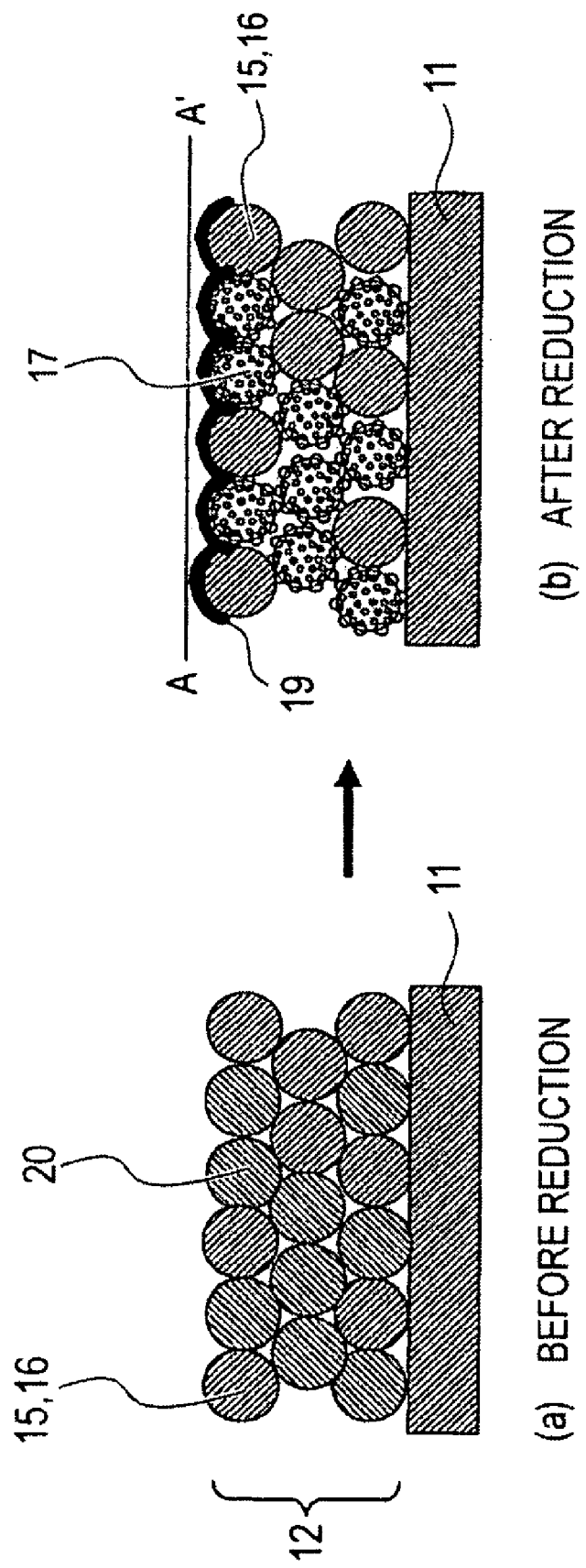
FIG. 6 is diagrammatic sectional views which illustrate structures obtained in steps for producing the hydrogen electrode according to the example of embodiments.

Examples of production steps in the embodiments are shown in FIGS. 4 and 5, and diagrammatic views of electrode structures are shown in FIGS. 1 and 6.

First, an NiO powder is mixed with an $Al_2O_3$ powder, and the mixture is burned to produce a nickel-aluminum composite oxide solid solution represented by $NiAl_2O_4$. This solid solution is pulverized and used as particles 20. The powder thus obtained by pulverization has a particle diameter of preferably about from 0.1 µm to several micrometers. Subsequently, the composite oxide solid-solution particles 20 thus produced are mixed with particles 16 having electron/ion mixed conductivity. Water or an aqueous solution of metal salts, e.g., nitrates, prepared so as to result in the target composition of a coating film 18 having mixed conductivity is added to the powder mixture to obtain a paste. Examples of the coating film 18 having mixed conductivity and of the particles 16 having mixed conductivity include $CeO_2$ doped with $Sm_2O_3$, $CeO_2$ doped with $Gd_2O_3$, and $CeO_2$ doped with $Y_2O_3$. However, the film 21 and particles 16 should not be construed as being limited to these examples, and any material having high oxygen ion conductivity and high electronic conductivity at temperatures ranging from 400° C. to 1,000° C. may be used.

Subsequently, the powder mixture in a paste form is applied to a surface of a solid electrolyte plate 11 by screen printing, and the coating is burned by heating to a temperature which results in an elevated strength of bonding between the plate 11 and the coating. In general, it is preferred to burn the coating at a temperature in the range of from 1,200° C. to 1,400° C. Methods for forming particles 16 having mixed conductivity, composite oxide solid-solution particles 20, and a coating film having mixed conductivity should not be construed as being limited to the method described above. Use may be made of a method in which the powder mixture is slurried and this slurry is applied by roller coating, dipping, or spray coating to produce the target structure. Alternatively, the slurry may be formed into a sheet and then superposed. The coating film having mixed conductivity may be produced by preparing an aqueous solution of metal salts, e.g., nitrates, so as to result in a target composition, applying this solution beforehand to the surface of composite oxide solid-solution particles 20 by roller coating, dipping, or spray coating, and pyrolyzing the resultant coating. (FIG. 5).

In FIGS. 1 and 6, the particles 16 and 20 and the coating film 18 are exaggeratedly illustrated for easy understanding. However, the actual particles have been bonded together and united because of sintering and constitute a network. From the standpoint of gas diffusibility in the electrode, it is preferred that the electrode layer should be porous. A pore-forming material which disappears upon burning to form pores may be incorporated beforehand. Examples of the pore-forming material include organic ones such as, e.g., acrylic spherical particles.

In one example of the embodiments of the invention, a processing for heightening the efficiency of current collection is further conducted. In a final material constitution, metal particles functioning as a catalyst and having electronic conductivity are fine particles which are isolated and dispersed. It is therefore necessary to take a measure for securing sufficient contact with a current collector 14. In ordinary techniques, a metal mesh or the like capable of serving as a current collector is pushed against the electrode to establish contact. In the example of the embodiments, however, a conductive layer 19 is superposed on the electrode using a material having higher electronic conductivity than the electrode, and this conductive layer 19 is brought into contact with a current collector 14 to thereby secure current collection (FIG. 6).

It is preferred that the area occupied by this conductive layer 19 should account for 40 to 100% of the hydrogen electrode surface and that the porosity of the conductive layer 19 should be 30 to 80%. It is preferred that the thickness of the conductive layer 19 is set within a range not to hinder the diffusion of gas generated from a fuel or due to an electrode reaction. As an electron conductive particle for use in the conductive layer, at least one metal selected from Pt, Au, Ag, Ni, Fe, Co and Cu, alloys containing two or more of the metals, or the like may be used. The metal materials are mixed with ion conductive particles such as YSZ, ScSZ and the like or particles having electron/ion mixed conductivity such as SDC, GDC, YDC and the like, and the mixture of these ingredients is used in the form of a paste. The two ingredients are mixed preferably in such a ratio that the proportion of the metal is 40-90 vol % based on the whole. This is because not only such a mixing ratio improves tight contact with and adhesion to the electrode but also the conductive layer itself can be expected to function as a catalyst. The conductive layer paste is coated on the surface of hydrogen electrode 12 using a screen printing and the paste is burned with rising the temperature to such an extent that the adhesive strength between the both is increased. Generally, the burning is preferably conducted within the range of from 800° C. to 1,000° C.

The printed conductive layer part is burned. Thereafter, the hydrogen electrode is subjected to a reduction treatment in a reducing atmosphere having a temperature of from 800° C. to 1000° C. Ordinary NiO reduction treatments are conducted at a temperature of about 900° C. without using an unnecessarily high temperature. However, in the embodiments, in which $NiAl_2O_4$ is used as a main component, it is more preferred to conduct the reduction at 900° C. or higher for the purpose of sufficiently depositing nickel. Although the period of reduction is not particularly limited, about 10 minutes may suffice.

Through the reduction, the nickel ingredient present in the state of solid solution in the $NiAl_2O_4$ part separates out and deposits on the surface to give a base made of an aluminum oxide (mainly $Al_2O_3$) Namely, nickel-particle-supporting $Al_2O_3$ 17 is formed. The fine metal particles thus formed have a size of generally tens of nanometers. From the standpoint of enabling the fine metal particles to have high catalytic activity, the size thereof is preferably about from 5 nm to 500 nm. Metal particles having a size smaller than 5 nm are difficult to produce actually. Metal particles larger than 500 nm are apt to bond to adjoining ones and this may pose the same problem as in the conventional technique in which NiO is used after having been reduced. A more preferred range of the size of the fine metal particles as a catalyst is about from 20 nm to 100 nm. This size is smaller than the conventional electrode catalyst sizes by one to two orders of magnitude. An improvement in catalytic activity is hence expected. Consequently, the amount of the $NiAl_2O_4$ to be added is preferably in the range of from 5% by weight to 80% by weight based on all materials constituting the electrode. More preferably, the amount thereof is from 10% by weight to 50% by weight.

According to the embodiments, a reduction in catalyst amount can be attained and, hence, the proportion of the material having mixed conductivity can be increased. Consequently, the difference in thermal expansion between the electrode layer and the solid electrolyte and the difference due to conformation mismatch can be diminished.

The metal particles deposited are present on a surface part of the $Al_2O_3$ as a base so as to form only one layer. These particles have satisfactory conformability to the base and are tenaciously bonded thereto. Consequently, the metal particles are characterized in that even when exposed to a high-temperature reducing atmosphere, the particles do not readily move.

In addition, since the metal particles are fine and isolated, this hydrogen electrode has an advantage that even when the electrode layer undergoes abrupt oxidation, the resultant volume expansion is only local and is less apt to lead to breakage.

As described above, in producing a hydrogen electrode according to the embodiments, fine nickel particles can be fixed to a base. In addition, high activity and long-term stability can be provided with a small nickel addition amount. When this hydrogen electrode is used in combination with an oxygen electrode employing a preferable electrode catalyst, inexpensive high-power cells which may be not only flat cells but also cylindrical or electrode-supported cells or the like can be realized.

On the other hand, fine particles of a noble metal having a catalyzing effect may be added in a slight amount to the hydrogen electrode. Examples of such noble-metal particles include particles of Pt, Au, Ag, Rh, Ir, Ru, and Pd.

The nickel-particle-supporting $Al_2O_3$ produced by reducing $NiAl_2O_4$ is usable also as a catalyst for the reforming of hydrocarbon fuels including methane. Namely, it is applicable to a variety of fuels.

According to the embodiments of the invention, the techniques described above can be used to produce a catalyst having conductivity by the inexpensive solution method and to provide a highly active hydrogen electrode necessary for realizing a solid oxide electrochemical cell having stability and excellent output performance. In the electrode production process also, an inexpensive production technique such as screen printing or spray coating can be used and low-cost production is possible.

The embodiments are explained below in more detail by reference to Examples. Possible combinations of electrode-constituting materials in the embodiments of the invention, in the case where the metal particles are nickel as an example, are shown in Table 1.

TABLE 1

| Example | Metal catalyst | Support oxide | Surface coating | Ionic conductor |
|---|---|---|---|---|
| Example 1 | Ni | $Al_2O_3$ | SDC | SDC |
| Example 2 | Ni | $Al_2O_3$ | SDC | YSZ |
| Example 3 | Ni | $Al_2O_3$ | SDC | YDC |
| Example 4 | Ni | $Al_2O_3$ | SDC | ScSZ |
| Example 5 | Ni | $Al_2O_3$ | GDC | SDC |
| Example 6 | Ni | $Al_2O_3$ | GDC | GDC |
| Example 7 | Ni | $Al_2O_3$ | GDC | YDC |
| Example 8 | Ni | $Al_2O_3$ | GDC | YSZ |
| Example 9 | Ni | $Al_2O_3$ | GDC | ScSZ |
| Example 10 | Ni | $Al_2O_3$ | YDC | SDC |
| Example 11 | Ni | $Al_2O_3$ | YDC | GDC |
| Example 12 | Ni | $Al_2O_3$ | YDC | YDC |
| Example 13 | Ni | $Al_2O_3$ | YDC | YSZ |
| Example 14 | Ni | $Al_2O_3$ | YDC | ScSZ |
| Comparative Example 1 | Ni | $Al_2O_3$ | nil | SDC |
| Comparative Example 2 | Ni | $Al_2O_3$ | nil | YSZ |

Cells employing electrodes which include $Sm_2O_3$-doped $CeO_2$ as the sinter having ionic conductivity and as the film having mixed conductivity and which has been produced using $NiAl_2O_4$ as the oxide solid solution are explained below as examples. The particle diameter and other properties of each of the powders used should not be construed as being limited to those shown below.

<Preparation of Oxide Solid Solution>

An NiO powder having an average particle diameter of about 1 μl and an $Al_2O_3$ powder having an average particle diameter of about 0.4 μm were weighed out in such amounts as to result in a molar ratio of 1:1. The powders were mixed together by means of a mortar. The resultant powder mixture was press-molded, and the molding was sintered in argon at 1,3000° C. for 5 hours. The constituent phases of the oxide solid solution obtained were examined by X-ray diffractometry. Subsequently, the oxide solid solution was pulverized and passed through a 40-μm mesh sieve to obtain a starting powder.

<Preparation of Aqueous Metal Salt Solution for Forming Coating Film Having Mixed Conductivity and Formation of Coating Film Having Mixed Conductivity on Surface of Oxide Solid Solution>

An aqueous solution of cerium nitrate was mixed with an aqueous solution of samarium nitrate in such a proportion as to result in the target SDC composition. Thus, an aqueous metal salt solution for forming a coating film having mixed conductivity was prepared so as to have a concentration of 0.4 M in terms of SDC concentration.

The oxide solid-solution particles obtained by pulverization were immersed in the aqueous solution of cerium and samarium nitrates prepared. The excess aqueous solution was removed by suction filtration. Thereafter, the particles were dried at room temperature overnight and heat-treated at 1,000° C. for 30 minutes. Thus, an oxide solid solution coated with a film having mixed conductivity was prepared. This coated oxide solid solution was subjected to a hydrogen reduction treatment at 1,000° C. for 10 minutes to deposit a metal from the oxide solid solution. Thus, an oxide sinter having fine metal particles deposited on the surface thereof was obtained.

EXAMPLE 1

<Production of Solid Oxide Electrochemical Cell Employing Oxide Solid Solution Coated with Film Having Mixed Conductivity>

YSZ ($ZrO_2$ stabilized with 8 mol % $Y_2O_3$) processed into a shape having a diameter of 15-18 mm and a thickness of 500 µm was used as a solid oxide electrolyte. A porous platinum electrode was used as an oxygen electrode. Another porous platinum electrode was used as a reference electrode on the edge side of the electrolyte.

The oxide solid solution produced in <Preparation of Oxide Solid Solution> and SDC [$(SmO_{1.5})_{0.2}(CeO_2)_{0.8}$] particles having an average particle diameter of 0.3 µm as a sinter having ionic conductivity were weighed out in such amounts as to result in a weight ratio of 20:80 in terms of pulverized-particle ratio by weight. The two ingredients were mixed together. The aqueous metal salt solution for forming a coating film having mixed conductivity was added to the resultant mixed powder in an amount of about 30% by weight based on the mixed powder. The resultant mixture was treated with a high-speed rotary mixer to obtain a paste. Using a screen printer, this paste was printed in a size having a diameter of 6 mm on a central part of the solid oxide electrolyte. After the printing, the solid oxide electrolyte was placed in an atmospheric furnace and the paste applied was burned at 1,300° C. for 2 hours to obtain a hydrogen electrode. Subsequently, a platinum electrode was likewise deposited by printing on the opposite side to obtain an oxygen electrode. Furthermore, a platinum reference electrode was applied to the edge side of the electrolyte and burned at 960° C. for 30 minutes. Thereafter, a nickel paste containing YSZ particles (in such an amount as to result in an Ni/YSZ ratio of 82:18 by weight) was printed on a surface layer part of the hydrogen electrode produced, in a meshy pattern arrangement through a screen mesh produced so as to give a wiring having a line width of about 30 µm and a line-to-line distance of about 500 µm. The paste printed was then heat-treated at 1,000° C. for 30 minutes in an argon atmosphere to fix a meshy wiring to the electrode surface.

COMPARATIVE EXAMPLE 1

An oxide solid solution produced in the same manner as in <Preparation of Oxide Solid Solution> in Example 1 and SDC [$(SmO_{1.5})_{0.2}(CeO_2)_{0.8}$] particles having an average particle diameter of 0.3 µm as a sinter having ionic conductivity were weighed out in such amounts as to result in a weight ratio of 20:80 in terms of pulverized-particle ratio by weight. The two ingredients were mixed together. Pure water was added to the resultant mixed powder in an amount of about 40% by weight based on the mixed powder. The resultant mixture was treated with a high-speed rotary mixer to obtain a paste. Using a screen printer, this paste was printed in a size having a diameter of 6 mm on a central part of the solid oxide electrolyte. After the printing, the solid oxide electrolyte was placed in an atmospheric furnace and the paste applied was burned at 1,300° C. for 2 hours to obtain a hydrogen electrode. Subsequently, a platinum electrode was likewise deposited by printing on the opposite side to obtain an oxygen electrode. Furthermore, a platinum reference electrode was applied to the edge side of the electrolyte and burned at 960° C. for 30 minutes. Thereafter, a nickel paste containing YSZ particles (in such an amount as to result in an Ni/YSZ ratio of 82:18 by weight) was printed on a surface layer part of the hydrogen electrode produced, in a meshy pattern arrangement through a screen mesh produced so as to give a wiring having a line width of about 30 µm and a line-to-line distance of about 500 µm. The paste printed was then heat-treated at 1,000° C. for 30 minutes in an argon atmosphere to fix a meshy wiring to the electrode surface.

EXAMPLE 2

An oxide solid solution produced in the same manner as in <Preparation of Oxide Solid Solution> in Example 1 and YSZ [$(Y_2O_3)_{0.8}(ZrO_2)_{0.92}$] particles having an average particle diameter of 0.3 µm as a sinter having ionic conductivity were weighed out in such amounts as to result in a weight ratio of 80:20 in terms of pulverized-particle ratio by weight. The two ingredients were mixed together. The aqueous metal salt solution for forming a coating film having mixed conductivity was added to the resultant mixed powder in an amount of about 30% by weight based on the mixed powder. The resultant mixture was treated with a high-speed rotary mixer to obtain a paste. Using a screen printer, this paste was printed in a size having a diameter of 6 mm on a central part of the solid oxide electrolyte. After the printing, the solid oxide electrolyte was placed in an atmospheric furnace and the paste applied was burned at 1,300° C. for 2 hours to obtain a hydrogen electrode. Subsequently, a platinum electrode was likewise deposited by printing on the opposite side to obtain an oxygen electrode. Furthermore, a platinum reference electrode was applied to the edge side of the electrolyte and burned at 960° C. for 30 minutes. Thereafter, a nickel paste containing YSZ particles (in such an amount as to result in an Ni/YSZ ratio of 82:18 by weight) was printed on a surface layer part of the hydrogen electrode produced, in a meshy pattern arrangement through a screen mesh produced so as to give a wiring having a line width of about 30 µm and a line-to-line distance of about 500 µm. The paste printed was then heat-treated at 1,000° C. for 30 minutes in an argon atmosphere to fix a meshy wiring to the electrode surface.

COMPARATIVE EXAMPLE 2

An oxide solid solution produced in the same manner as in <Preparation of Oxide Solid Solution> in Example 1 and YSZ [$(Y_2O_3)_{0.8}(ZrO_2)_{0.92}$] particles having an average particle diameter of 0.3 µm as a sinter having ionic conductivity were weighed out in such amounts as to result in a weight ratio of 20:80 in terms of pulverized-particle ratio by weight. The two ingredients were mixed together. Pure water was added to the resultant mixed powder in an amount of about 40% by weight based on the mixed powder. The resultant mixture was treated with a high-speed rotary mixer to obtain a paste. Using a screen printer, this paste was printed in a size having a diameter of 6 mm on a central part of the solid oxide electrolyte. After the printing, the solid oxide electrolyte was placed in an atmospheric furnace and the paste applied was burned at 1,300° C. for 2 hours to obtain a hydrogen electrode. Subsequently, a platinum electrode was likewise deposited by printing on the opposite side to obtain an oxygen electrode. Furthermore, a platinum reference electrode was applied to the edge side of the electrolyte and burned at 960° C. for 30 minutes. Thereafter, a nickel paste containing YSZ particles (in such an amount as to result in an Ni/YSZ ratio of 82:18 by weight) was printed on a surface layer part of the hydrogen electrode produced, in a meshy pattern arrangement through a screen mesh produced so as to give a wiring having a line width of about 30 μm and a line-to-line distance of about 500 μm. The paste printed was then heat-treated at 1,000° C. for 30 minutes in an argon atmosphere to fix a meshy wiring to the electrode surface.

<Cell Characteristics Evaluation Test1>

The flat type solid oxide electrochemical cell produced in Example 1 and the cell of the same type produced in Comparative Example 1 each were set on an output characteristics evaluation apparatus. The hydrogen electrode side and oxygen electrode side of each cell were sealed with a Pyrex (R) glass material. A platinum wire having a diameter of 0.1 mm was attached as a reference electrode to the edge side of the electrolyte. The cell was heated in an argon atmosphere. Thereafter, hydrogen was introduced into the hydrogen electrode to conduct a reduction treatment. This hydrogen reduction treatment was conducted at 1,000° C. for 10 minutes.

Subsequently, $H_2+H_2O$ were introduced into the hydrogen electrode at 50 mL/min, and dry air was introduced into the oxygen electrode at 30 mL/min. Under these conditions, each cell was evaluated for output characteristics. Furthermore, IR separation was conducted by the current interruption method.

<Cell Characteristics Evaluation Test 2>

The flat type solid oxide electrochemical cell produced in Example 2 and the cell of the same type produced in Comparative Example 2 each were set on an output characteristics evaluation apparatus. The hydrogen electrode side of each cell was sealed with a Pyrex (R) glass material. A platinum wire having a diameter of 0.5 mm was attached as a reference electrode to the edge side of the electrolyte. The cell was heated in an $N_2$ atmosphere. Thereafter, hydrogen was introduced into the hydrogen electrode to conduct a reduction treatment. This hydrogen reduction treatment was conducted at 1,000° C. for 30 minutes.

Subsequently, $H_2+H_2O$ were introduced into the hydrogen electrode at 50 mL/min, and dry air was introduced into the oxygen electrode at 50 mL/min. Under these conditions, each cell was evaluated for output characteristics. Furthermore, IR separation was conducted by the current interruption method.

Explanations are given below on the oxide solid solution prepared in <Preparation of Oxide Solid Solution> and on <Cell Characteristics Evaluation Test1> and <Cell Characteristics Evaluation Test 2>.

The oxide solid solution prepared in <Preparation of Oxide Solid Solution> and used in Examples 1 and 2 and Comparative Examples 1 and 2 was analyzed by X-ray diffractometry. As a result, the main peak was one assigned to $NiAl_2O_4$, and peaks assigned to SDC and nickel were also observed although small. On the other hand, in the case of the oxide sinter which had been obtained by reducing the oxide solid solution and had fine metal particles deposited on the surface thereof, peaks assigned to nickel and $Al_2O_3$ were detected and the peak assigned to $NiAl_2O_4$ had disappeared. It is therefore thought that the whole $NiAl_2O_4$ had been sufficiently reduced.

The oxide solid solution was examined with a thermogravimetric analyzer (TG) for weight change with reduction in hydrogen. As a result, the weight began to decrease, i.e., nickel began to deposit, at around 800° C. and a weight loss of about 7% was observed at 1,000° C. $NiAl_2O_4$ changes into Ni and $Al_2O_3$ upon reduction at high temperatures, and a weight loss corresponding to one oxygen atom in that change results. The weight loss of 7% observed at 1,000° C. well agrees with the theoretical weight loss resulting from the complete conversion of $NiAl_2O_4$ into Ni and $Al_2O_3$. It was thus ascertained that complete nickel deposition can be attained by reduction at 1,000° C. The results of the characteristics evaluation tests mean that the cells can be used more stably because the hydrogen electrodes include metal particles deposited at the high temperature of 1,000° C. and are used at lower temperatures.

Figure 7:
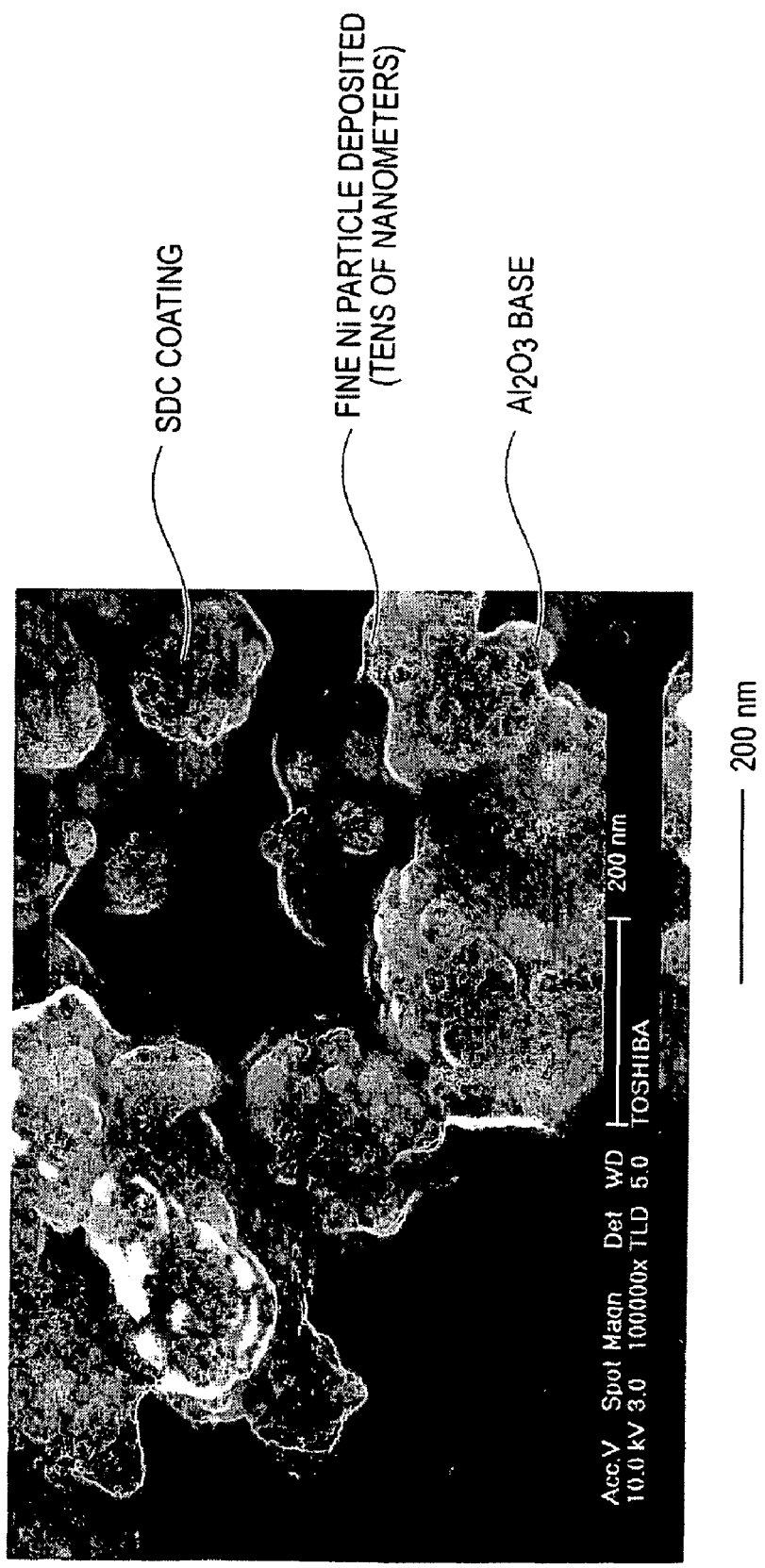
FIG. 7 is an SEM photograph of the hydrogen-reduced $NiAl_2O_4$ coated with an SDC film obtained in an Example according to the example of embodiments.

The $NiAl_2O_4$ which had undergone the reduction treatment was examined with an SEM. The results of the SEM examination of the reduced $NiAl_2O_4$ coated with an SDC film are shown in FIG. 7. It was found from the SEM examination results that the nickel deposited had a particle diameter of from several tens of nanometers to 100 nm and was in the state of being highly dispersed on the $Al_2O_3$ without overlapping. The coating film of SDC can be ascertained to surround each $Al_2O_3$ base particle like a shadow. It was thus ascertained that an SDC coating film having mixed conductivity was able to have been formed on the surface of the oxide solid solution.

Subsequently, the cell of Example 1 is compared with that of Comparative Example 1 in the results of the electrochemical characteristics evaluation. First, when the two cells are compared in maximum power density, the power density of the cell of Example 1 was found to have improved by about 5% as compared with the power density of the cell of Comparative Example 1. The two cells are then compared in ohmic resistance within the hydrogen electrode. The intraelectrode ohmic resistance on the hydrogen electrode side was determined by subtracting the theoretical resistance of the YSZ electrolyte used from the cell resistance between the terminals to determine the electrical resistance of the hydrogen electrode and taking this resistance as the intraelectrode ohmic resistance. In this connection, the contact resistance and intraelectrode resistance on the oxygen electrode side were regarded as sufficiently low because the oxygen electrode employed platinum. A comparison between the two cells in the results of the calculation of ohmic resistance within the hydrogen electrode revealed that the cell of Example 1 was able to have an ohmic resistance lower by about 15% than that of the cell of Comparative Example 1. From those comparisons in cell power density and ohmic resistance within the hydrogen electrode, it can be seen that the cell of Example 1 has higher characteristics than that of Comparative Example 1. The effectiveness of the SDC coating was thus demonstrated.

The cells of Example 2 and Comparative Example 2 are likewise compared in the results of the electrochemical characteristics evaluation. With respect to the maximum power densities of the two cells, the power density of the cell of Example 2 had improved by about 60% as compared with that of the cell of Comparative Example 2. These cells are further compared in ohmic resistance. The cell of Example 2 was able to have an ohmic resistance lower by about 30% than that of the cell of Comparative Example 2. From those comparisons in cell power density and ohmic resistance, it can be seen that the cell of Example 2 had higher characteristics than that of Comparative Example 2. The effectiveness of the SDC coating was thus demonstrated.

With respect to those effects of the film having mixed conductivity, the same effects are expected even when the metal particles are particles of Co, Fe, or Cu or of an alloy containing two or more of these metals and nickel, besides being nickel particles. Furthermore, the same effects are expected also in Examples 3 to 14, which were shown in Table 1.

EXAMPLE 15

A solid oxide electrochemical cell was produced in the same manner as in Example 1, except that $Ni_{0.33} Mg_{0.67}O$ containing 0.2 mol % $Sc_2O_3$ as a minor additive was used as an oxide solid solution in place of the $NiAl_2O_4$ used in Example 1. Thereafter, this cell was tested in the same manners as in Examples 1 and 2 and Comparative Examples 1 and 2. As a result, the effectiveness of the SDC coating was demonstrated. The minor additive to be added to the magnesium oxide solid solution is not limited to $Sc_2O_3$, and may be $Al_2O_3$ or $Cr_2O_3$. The same effects are expected even when the metal particles are particles of Co or Fe or of an alloy containing two or more of these metals and nickel, besides being nickel particles. Furthermore, even when the sinter having ionic conductivity is GDC, YDC, YSZ, or ScSZ, besides being SDC, the same effects can be expected.

What is claimed is:

1. A solid oxide electrochemical cell comprising a solid oxide electrolyte layer having ionic conductivity, a hydrogen electrode formed on one side of the electrolyte layer, and an oxygen electrode formed on the other side of the electrolyte layer so that the electrolyte layer is sandwiched between the electrodes, wherein the hydrogen electrode comprises:
    an oxide sinter which has fine metal particles deposited on a surface thereof, and
    a sinter having ionic conductivity, surfaces of the oxide sinter and the sinter being coated with a film having mixed conductivity in a reducing atmosphere.

2. The cell of claim 1, wherein the oxide sinter is an aluminum-based oxide or a magnesium-based oxide, and the fine metal particles are particles of at least one metal selected from Ni, Co, Fe, and Cu.

3. The cell of claim 1, wherein the sinter having ionic conductivity comprises at least one member selected from a $ZrO_2$-based material stabilized with $Y_2O_3$ or $Sc_2O_3$, $CeO_2$ doped with $Sm_2O_3$, $CeO_2$ doped with $Gd_2O_3$, and $CeO_2$ doped with $Y_2O_3$, and the film having mixed conductivity comprises at least one member selected from $CeO_2$ doped with $Sm_2O_3$, $CeO_2$ doped with $Gd_2O_3$, and $CeO_2$ doped with $Y_2O_3$.

4. The cell of claim 1, which further comprises a current collector and in which the hydrogen electrode has a conductive layer having a porosity of 30 to 80% and comprising a mixture comprising (i) at least one metal material selected from Pt, Au, Ag, Ni, Fe, Co and Cu or an alloy containing two or more of the metals, and (ii) an ion conductive material or a material having electron and ion mixed conductivity, which materials constitute the hydrogen electrode, said conductive layer being in contact with the current collector.

5. The cell of claim 4, wherein the conductive layer is formed by means of a screen printing method, a splay coating method or a vapor deposition method and the area occupied by the conductive layer accounts for 40 to 100% of the hydrogen electrode surface.

6. The cell of claim 1, wherein the oxygen electrode comprises a layer of a composite oxide represented by $Ln_{1-x}A_xBO_{3-TM}$ (wherein Ln is at least one rare-earth element; A is at least one of Sr, Ca, and Ba; B is at least one of Cr, Mn, Fe, Co, and Ni; x is a positive number of from 0 to 1; and TM is a positive number of from 0 to 3) or a layer of a mixture of the composite oxide and at least one member selected from $CeO_2$ doped with $Sm_2O_3$, $CeO_2$ doped with $Gd_2O_3$, and $CeO_2$ doped with $Y_2O_3$.

* * * * *